US007095442B2

(12) United States Patent
van Zee

(10) Patent No.: US 7,095,442 B2
(45) Date of Patent: Aug. 22, 2006

(54) METHOD AND APPARATUS FOR CAPTURING AN IMAGE

(75) Inventor: Pieter J van Zee, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 597 days.

(21) Appl. No.: 10/061,547

(22) Filed: Jan. 31, 2002

(65) Prior Publication Data

US 2003/0142227 A1 Jul. 31, 2003

(51) Int. Cl.
*H04N 5/222* (2006.01)
(52) U.S. Cl. .............................. 348/333.01; 348/333.02
(58) Field of Classification Search ............. 348/14.02, 348/333.01, 333.02, 333.05, 333.11, 333.12; 463/43–45, 36, 47; 363/30
See application file for complete search history.

(56) References Cited

U.S. PATENT DOCUMENTS

| 5,966,553 | A | | 10/1999 | Nishitani et al. ........... 396/303 |
|---|---|---|---|---|
| 6,069,648 | A | * | 5/2000 | Suso et al. ................ 348/14.02 |
| 6,344,875 | B1 | * | 2/2002 | Hashimoto et al. ...... 348/207.1 |
| 6,435,969 | B1 | * | 8/2002 | Tanaka et al. ................ 436/44 |
| 6,441,854 | B1 | * | 8/2002 | Fellegara et al. ...... 348/333.13 |
| 6,530,838 | B1 | * | 3/2003 | Ha et al. ...................... 463/36 |
| 6,811,492 | B1 | * | 11/2004 | Arakawa et al. ............. 463/47 |
| 6,852,033 | B1 | * | 2/2005 | Kinjo et al. .................. 463/30 |

FOREIGN PATENT DOCUMENTS

EP 0 978 987 * 2/2000

OTHER PUBLICATIONS

Eyemodule User's Manual, 2000, Blocks Products.*
Eyecontact Quick Guide, 2000, Blocks Products.*
Kodak, PalmPix User's Guide, 2001, Eastman Kodak.*
Visor Handheld User Guide, 2000, Handspring Inc.*
Intel Pro/100 Mobile Adaptors Data Sheet; www.intel.com/network; Jan. 2002; 4 pages.
SMaL Camera Technologies; http://www.smaicamera.com/; Jan. 14, 2002; 1 page.
SMaL UltraPocket Camera; http://smalcamera.com/ultrapocketcamera.html; Jan. 14, 2002; 2 pages.
Handheld Adapters; Intel Network Connectivity Handheld Adapters; http://www.intel.com/network/connectivity/products/handheld_Adapters.htm; Jan. 14, 2002; 1 page.
Handheld Adapters For Pocket PCs; Intel Network Connectivity Handheld Adapters For Pocket PCs; http://www.intel.com/network/connectivity/products/pocketpc_family.htm; Jan. 14, 2002; 1 page.
PDA Buyer's Guide: Kyocera 6035 Palm OS Smartphone; Kyocera QCP 6035 Palm OS Smartphone; http://www.pdabuyersguide.com/kyocera6035.htm; Jan 14, 2002; 2 pages.
Kenwood Communications / Products; Amateur Radio-Portables-VC-H1; http://www.kenwood.net/products/index.cfm?AMA=open&ama_hheld=open&radio=VC-H1&selection=Amateur&ID=51; Jan. 14, 2002; 8 pages.
Product And Applications [ICM-102A]; http://www.ic-media.com/icm-532.htm; Jan. 14, 2002; 8 pages.
HP Jornada 540 Series Pocket PC—User's Guide; Hewlett-Packard; Part No: F1824-900241t; Edition 1; Printed in Singapore; 2 pages.

* cited by examiner

*Primary Examiner*—David Ometz
*Assistant Examiner*—Kelly Jerabek
(74) *Attorney, Agent, or Firm*—Raymond A. Jenski

(57) ABSTRACT

A handheld computing and digital image capturing device is physically and electrically integrated. Such a device shares hardware and computing power to provide a versatile item that can be carried with a user to provide the expected computer functions and an image capturing capability. Such a device has the capability of integrating images from the image capturing function into documents created in the handheld computer. Additionally, such an image capturing device can be coupled to an external computer without an intervening cable.

9 Claims, 4 Drawing Sheets

METHOD AND APPARATUS FOR CAPTURING AN IMAGE

BACKGROUND

The present invention relates to an image capturing apparatus and more particularly relates to a user-convenient combination of a handheld device for a computer and a digital camera.

Photography is a well known and widely used technique for capturing images for later appreciation and use. Digital photography—digital image capturing—is a recent development made possible by lower cost optical to electronic conversion devices such as relatively high resolution charge coupled device (CCD) arrays and similar mechanisms, more powerful and energy efficient microprocessors, and small and low cost memory devices. Advantages to the user of a digital camera, as it is commonly known, are the ability to capture, store, and immediately view a picture, and the ability to correct defects in the stored picture either in situ or later using a computer system. Users of a digital camera naturally expect to carry their camera with them when they expect an opportunity for taking a picture to occur. Unfortunately, the best picture opportunity often occurs when the user is not carrying the digital camera.

Another item that has become a constant companion to people is the handheld computer, often referred to as a personal digital assistant (PDA), among other things. Many users carry their PDA at all times, with the expectation that they will need to refer to their stored personal calendar, address book, calculator, word processor, or the numerous other functions that such a computing device can perform.

Improvement in the computing power of handheld devices combined with the miniaturization of many hardware components promises to provide an even more versatile item for mobile people. Thus, a sharing of certain hardware elements and the latent computing power of a handheld computing device with image capturing hardware and software could offer users an item that enables a digital camera to be available to them when they need it because it can be part of a regularly carried item.

SUMMARY OF THE INVENTION

An image capturing device and method comprises an optoelectric transducer disposed in a housing, arranged to accept optical input via a light transmissive opening through the housing and to convert the optical input to an electrical signal. An image processor is disposed within the housing and is electrically coupled to the optoelectric transducer. A handheld computing device is disposed within the housing, coupled to the image processor, and includes a microprocessor, memory coupled to the microprocessor, a user interface, an external computer interface, and a display. The display, when switched from displaying computing device information, displays an image regenerated at least in part by the microprocessor from the electrical signal. The user interface comprises at least one electromechanical activator and, when switched from accepting computing device instruction, accepts a user instruction to save the electrical signal as a stored image representation.

DESCRIPTION OF A PREFERRED EMBODIMENT

Figure 1A:
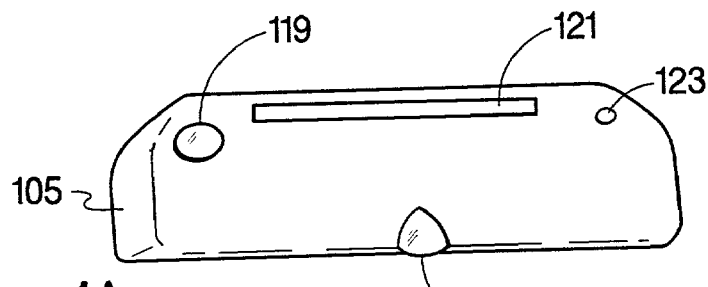
FIGS. 1A, 1B, and 1C are top, front, and bottom views, respectively, of a handheld computing device which may employ the present invention.
Figure 1B:
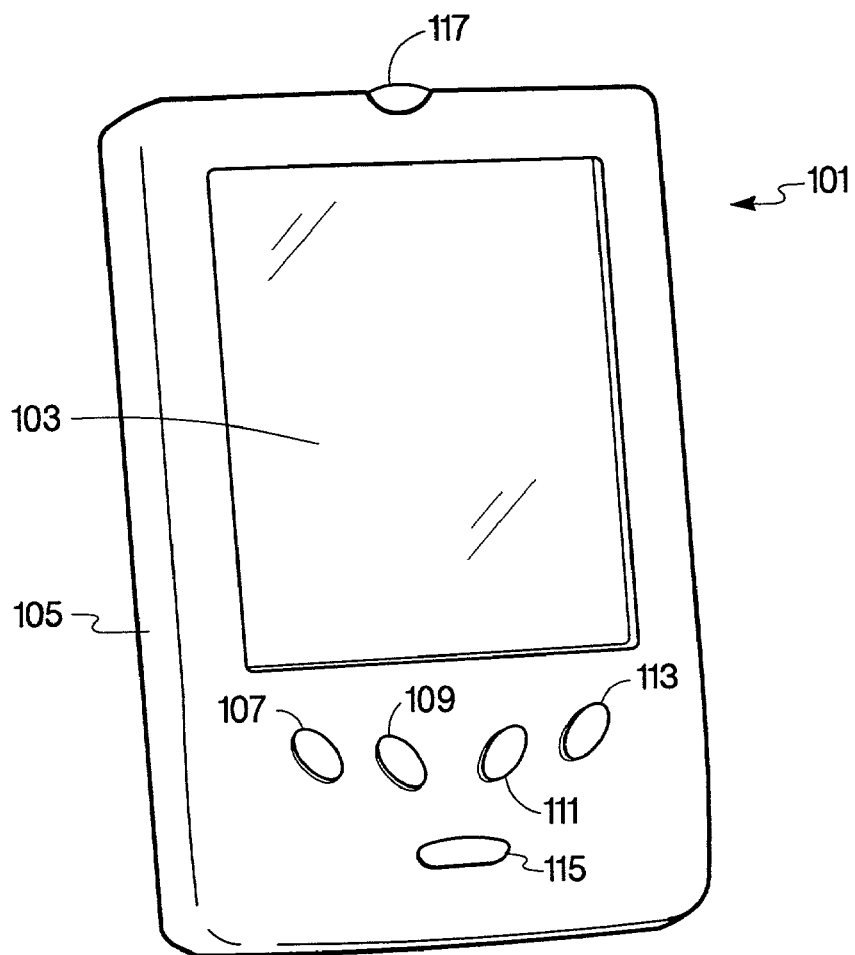
Figure 1C:
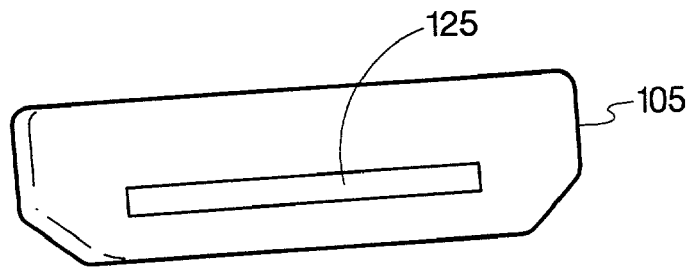

A physically and electrically integrated handheld device and digital image capturing device offers a user an item that, because of its versatility, can be carried with the user to provide the expected computer functions with a novel addition of an image capturing and integrating capability. A preferred embodiment of such an integrated item is shown in the drawings of FIGS. 1A, 1B, and 1C. A handheld computing device 101, which can have similarities in form and computing function to a Jornada 540 Series PDA available from Hewlett-Packard Company or other devices of adequate computing power and memory, is most recognizably visible in FIG. 1B. A display screen 103, preferably with tactile input and color presentation capability, is disposed on the front of and contained within the housing 105 of the device 101. Several buttons 107, 109, 111, and 113 connect to electrical switches (not shown) to form an electromechanical actuator part of a user interface with a microprocessor of the PDA and, in a preferred embodiment, are useable for variable functions depending upon the mode of operation of the PDA. Another button 115 connects with an electrical power switch to turn the PDA on and off. A visible indicator 117, which is a light emitting diode in the preferred embodiment, provides operational feedback to the user.

A light transmissive opening 119 through the housing 105 is visible in the top view of FIG. 1A and provides the aperture for light from a scene to be captured as an image to enter the optoelectric transducer of the digital camera function of the PDA. A conventional card slot connector 121 provides an interface to additional memory cards such as a CompactFlash™ card. A standard 3.5 mm stereo earphone jack 123 is also located on the top of the PDA to provide an audio output from the PDA. A conventional serial connector 125, for interconnection with a separate computer, and a DC power supply connector are located at the bottom of the PDA and are visible in FIG. 1C.

Figure 2:
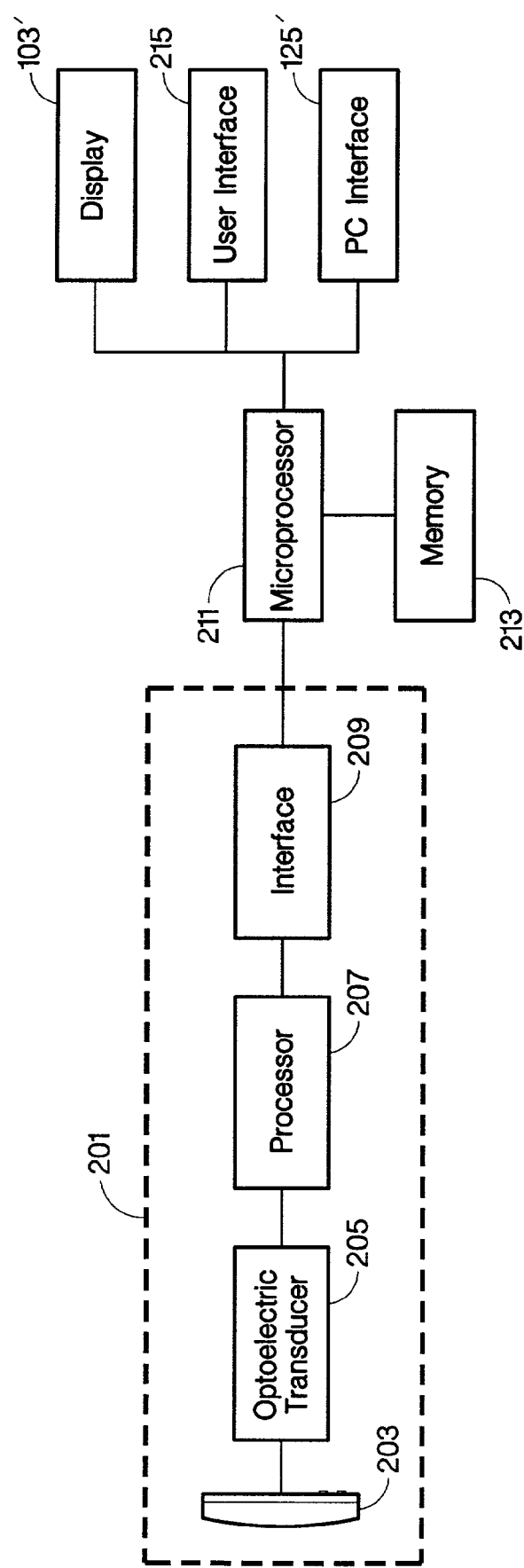
FIG. 2 is a block diagram of a combined handheld computing device and a digital image capturing device which may employ the present invention.

A block diagram of the electrical functions of the integrated PDA and digital camera of the preferred embodiment of the present invention is shown in FIG. 2. A digital image capturing device 201 comprises the basic functions of an optical lens system 203, an optoelectric transducer 205, a custom processor 207, and an interface 209. In the preferred embodiment, an ICM532A CMOS image sensor (available from IC Media Corporation) is employed as the digital image capturing device and provides a USB 1.1 output signal for conveying a compressed image representation to a microprocessor 211 of the PDA. The PDA typically has a suite of application programs available to its user such as a calculator, a spread sheet, a word processor, a calendar, a address book, and the like each of which having its elemental software stored in a memory 213 and each providing visible output to the user on the display 103'. User generated data for each program is also stored in the memory. In the preferred embodiment, a camera mode is available as an option, preferably as an icon selectable from the screen the activation of which energizes the image capturing device, reassigns the user interface buttons of the user interface 215 to the tasks of shutter actuator (button 107), manual focus (button 109), digital zoom (button 113), and screen toggle (button 111), and converts the screen, depending upon the activation of the screen toggle button, to a display of the image falling upon the photoelectric transducer. The screen toggle button switches the screen to display digital camera functions and user choices, for example the white balance, shutter and aperture adjustments, still or video clip image capture, and stored image recall, which is used, inter alia, for image transmission to the PC interface 125' for delivery to an external computer system.

When the PDA is in the camera mode and after the user has framed and formatted the desired image for capture, the user may activate the shutter actuator button to store the desired image representation in the memory. This operation can continue for in excess of 100 full resolution images (352×288 CIF, JPEG encoding) to be stored in the hardwired memory or for a number determined by the number of removable memory cards the user wishes to sequentially insert/remove from the connector 121. When the user wishes to upload the stored image representations into an external computer system, the screen toggle button 111 is repeatedly activated until the stored image recall screen is viewable in the display. Identification of stored images is displayed as a scrollable page of thumbnail icons, six per page, and associating information for each icon that can be selected with the use of a stylus or other tool (including a fingertip). Once the selection is made, a stylus selection of an "upload" icon is made from the screen and a repurposed shutter actuator button 107 can be depressed by the user to send the data signal representing the recalled and selected image to the PC interface connector. Image representations are deleted from the memory, in the preferred embodiment, by stylus selection of an image thumbnail, stylus selection of a "delete" icon on the display, and an activation of the again repurposed shutter actuator button 107.

A video clip sequence of image capture is available to the user upon selection of the video clip mode from the digital camera function screen. After the user selects this mode and determines the resolution, frame rate, and clip duration, an activation of the shutter actuation button starts the recording of the clip images. The recording lasts for the predetermined duration or an earlier second activation of the shutter actuation button.

It is a feature of the present invention that the shutter actuation button and the other controlling buttons provide an enhanced user experience. In a first user experience, the shutter actuation button provides instant on functionality: press and click the button and the camera takes a still image picture. Press and hold the button and the digital camera captures video and/or audio for as long as the button is depressed. There is no need to turn the camera on as a separate step. The button has enough click resistance and is recessed in the housing to avoid accidental activations.

Since the PDA and the digital camera are integral, otherwise standard PDA functions can be enhanced with an associated image from the image capture device. In the preferred embodiment, the digital camera is integrated with a "messaging/daily planner" software available on the PDA, such as the Microsoft Outlook application, available from Microsoft Corporation. Rather than having the images available only in the file system, as one would expect in conventional camera operation, the pictures are integrated into the "messaging/daily planner" software. Thus, the images appear: in the calendar as pictures taken on a given date, in the journal, in calendar appointments, in an email inbox or "picture inbox", in a map according to a location determined by the PDA/cell phone/GPS, and/or associated with address book items.

Consider the address book application in more detail. The address book application offers the option of displaying a thumbnail, or other reference to a user selected image stored in memory, with the name of an individual entry in the address book. The user would launch the address book application program, for example by actuating one of the user interface buttons that has been given the function of launching the address book. The user would find a listing of each entry in the address book presented on the display. The user would then launch the camera mode, thereby energizing the image capture device and repurposing the button 107 to the task of shutter actuator. The energized optoelectric transducer is aimed at the scene to be captured and the light entering the light transmissive opening is converted to an electrical signal. This signal is acted upon by the microprocessor 211 and presented on the display. When the user is satisfied with the composition of the displayed image and attendant to the capture of the image (adjusted, as described above by toggling the screen page and selecting adjustments), the user can actuate the shutter actuator button 107. This actuation causes the electrical signal representation to be processed and stored as an image representation in the memory 213. In a manner similar to the uploading of images to an external computer, the screen toggle button is repeatedly activated by the user until the stored image recall screen is viewable in the display. Among the thumbnail icons the user will see the most recently stored image representation. The user can select the desired image with the use of the stylus and once the selection is made, a stylus selection of a "copy" icon is made from the screen and a repurposed shutter actuator button can be depressed by the user to mark the selected image representation for pasting into the address book application. The address book application can then be reentered and the address book list is again displayed on the screen. With the use of the address book application's paste command, the selected image is placed into a column next to the desired address book entry, where it is displayed as a small thumbnail. When the screen-displayed thumbnail in the address book is tapped twice with the stylus, the stored image is presented in full on the display.

Likewise, a stored image can be selected by the user to be imported into a document being manipulated in a word processing program. Since the screen of the PDA is small, a thumbnail of the image is inserted into the screen representation but the full size image is recalled and exported with the document when the document is conveyed to the external computer system. Furthermore, a concordance of images and associated application program and document is maintained for and available to the user by way of the camera mode screen to associate any given image with a document.

Figure 3:
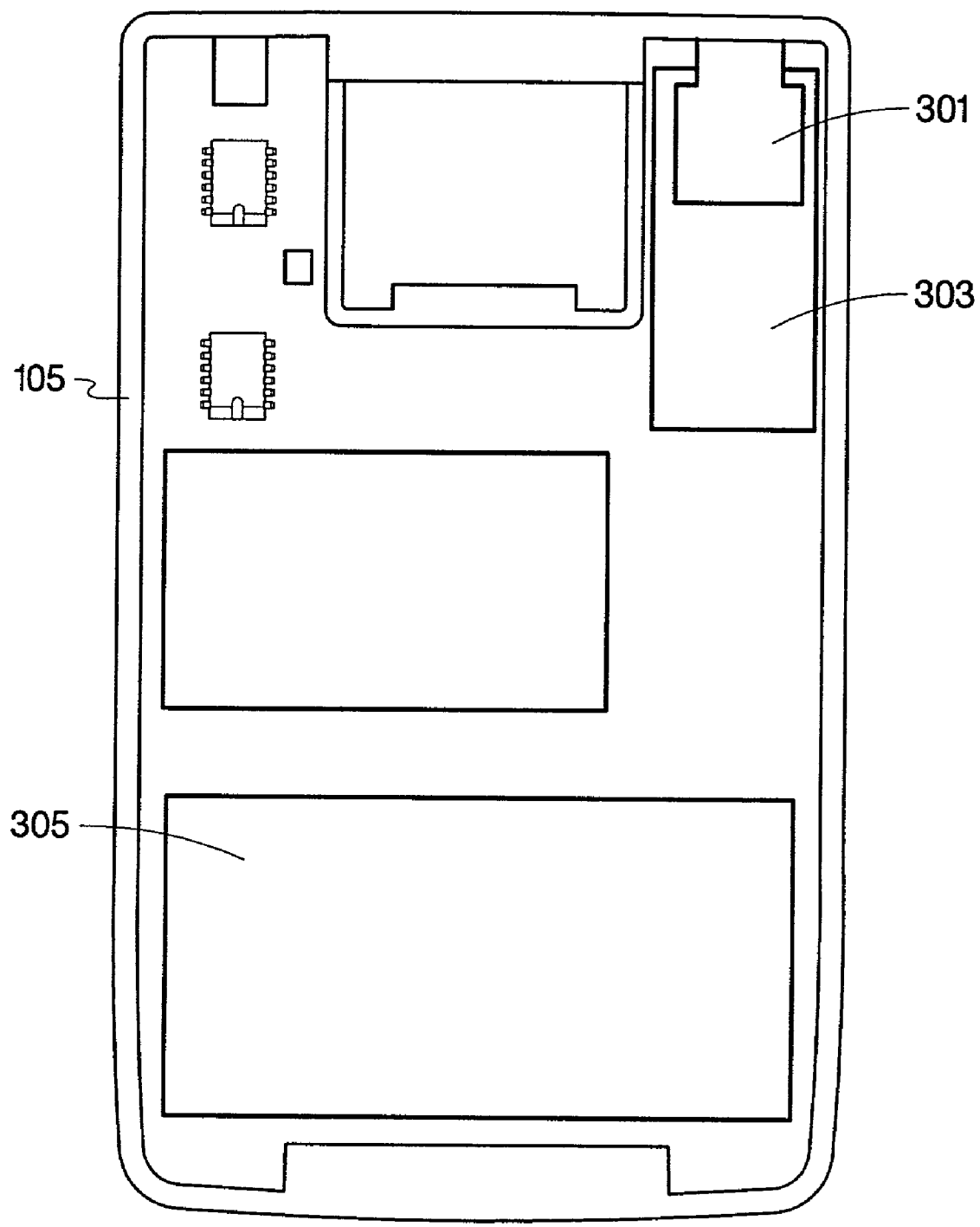
FIG. 3 is an interior view of the handheld computing device of FIG. 1B, illustrating a physical location embodiment of digital image capturing device hardware which may be employed in the present invention.

An internal view of the PDA from the back of the apparatus is shown in the drawing of FIG. 3. The lens system and the optoelectric transducer are enclosed in a separate enclosure 301 and oriented to accept light through the light transmissive opening 119 (visible in FIG. 1A) of the housing 105. The associated processor and interface and supporting circuitry are disposed on a circuit card 303 that is coupled to the remainder of the PDA. A lithium ion rechargeable battery 305 supplies power to both the PDA and the digital camera.

Figure 4:
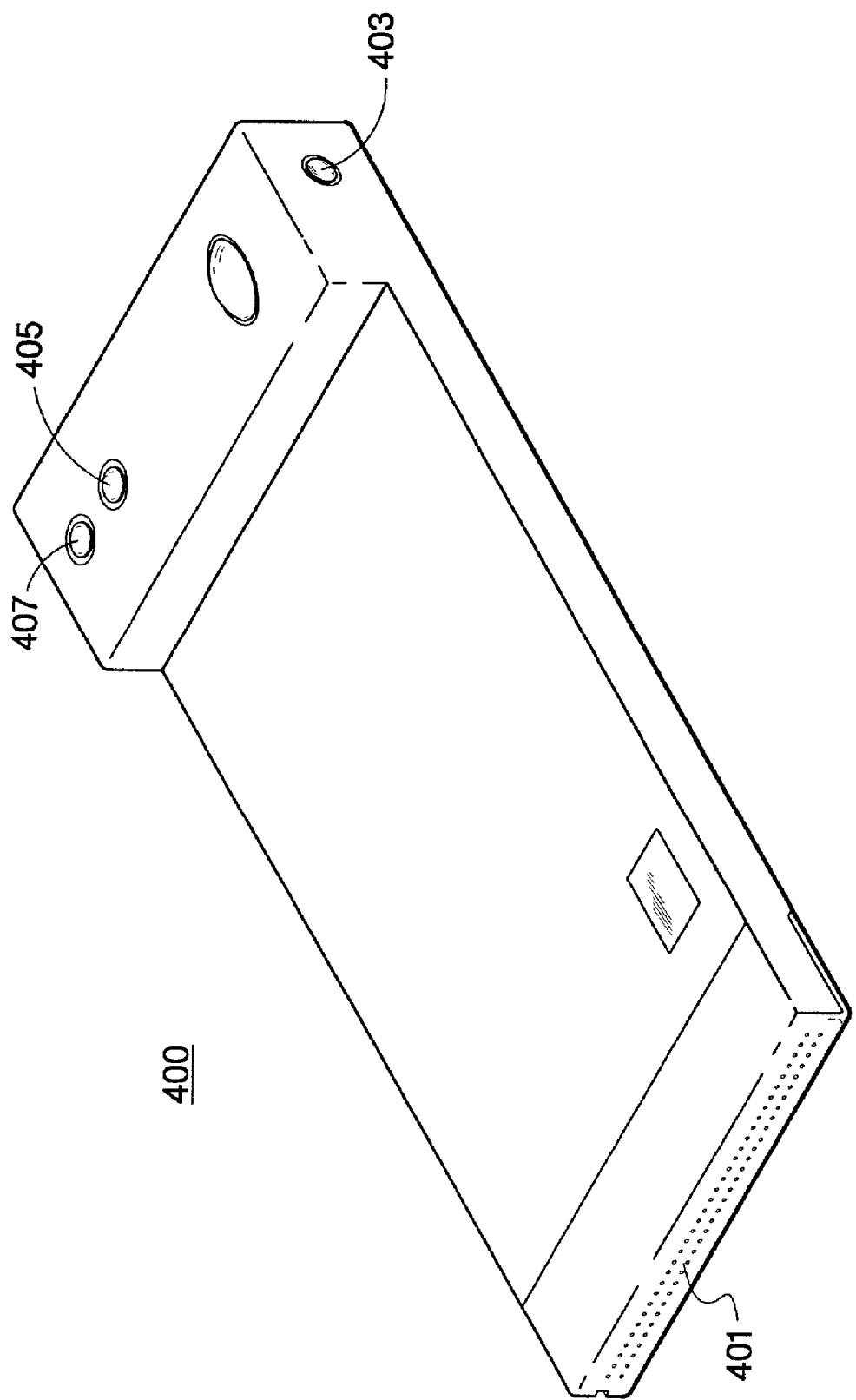
FIG. 4 is a front view of a handheld digital image capturing device which may employ the present invention

An alternative embodiment is shown in FIG. 4, in which the digital camera is miniaturized to fit within the physical dimensions of a PC-MCIA or PC-Card form factor (55 mm wide by 117 mm long by 5 mm thick) and having a PC-MCIA 68-pin socket connector 401 such that the camera 400 connects directly into the mating PC-MCIA computer peripheral connector on a user's computer. Such an embodiment provides the user with a versatile device with the mechanical hardware to plug into the computer—no cable or dock is needed. This means that the user does not have to carry anything additional besides the camera itself to plug into the computer. While a PC-MCIA type connector has been used in the alternative embodiment, other types of built-in or fold down or pop-out types of connectors, like a USB connector, may also be used in other embodiments of the present invention. Standardized connectors of the sort described above, and the associated protocols, are widely supported by most modern operating systems, so the user does not have to have along any additional software to be installed in the user's computer before the camera can be connected and accessed. In particular, the device presents itself as a "mass storage device", which means that its contents can be accessed as a file system using software like the standard File Explorer software. Thus, after the user has taken pictures by activating the recessed "shutter" button 403, the images stored in the digital camera 400 can easily be uploaded into the user's computer.

As described earlier, the shutter button 403 preferably offers an instant on functionality but alternatively, the shutter button 403 is activated once to turn the digital camera on and a second time to take a picture. The shutter button may be held depressed to record an audio sequence. For digital cameras equipped with sufficient memory, video is recorded when the shutter button 403 is depressed and held. User interface button 405 is disposed in a recessed well, to reduce the possibility of accidental activation, and is employed in the alternative embodiment to review the images already taken. Sequential momentary activation of the button 405 steps through the stored images and a continued depression of the button 405 turns the digital camera 400 off. The third user interface button 407 is used for picture deletion and for video clip deletion. For the digital cameras equipped for video clip recording, button 405 momentary depression enables viewing of previously stored still images and video clip images and a continuous depression turns the digital camera off.

Thus, an apparatus that physically and electrically integrates a handheld device and a digital image capturing device has been described in detail. Such a device advantageously shares hardware and computing power to offer a user an item that, because of its versatility, can be carried with the user to provide the expected computer functions with a novel addition of an image capturing capability. Moreover, such a device offers the capability of integrating images from the image capturing function into other documents created in the handheld device.

The invention claimed is:

1. An image capturing device comprising
   a housing;
   a computing device disposed in said housing and adapted to perform, inter alia, operations directed by at least one application program unrelated to image capture;
   an optoelectric transducer disposed in said housing, arranged to accept an optical input via a light transmissive opening through said housing, and to convert said optical input to an electrical signal;
   an image processor disposed within said housing and electrically coupled to said optoelectric transducer;
   a memory coupled to said image processor;
   a user interface further comprising a first electromechanical activator adapted to accept both a user instruction to turn the image capturing device on and to save said electrical signal as a stored image representation and a second electromechanical activator adapted to accept both a user instruction to review said stored image representation and to turn the image capturing device off; and
   an integral interface connector coupled to said image processor and adapted to be coupled to an external computer without an intervening cable.

2. An image capturing device in accordance with claim 1 wherein said first electromechanical activator further comprises an electromechanical activator recessed below an external surface of said housing.

3. An image capturing device in accordance with claim 1 wherein said second electromechanical activator is further adapted to accept a momentary user instruction to review said stored image representation and to accept a continuous user instruction to turn the image capturing device off.

4. An image capturing device in accordance with claim 1 wherein said user interface further comprises a third electromechanical activator adapted to accept a user instruction to delete said stored image representation.

5. A method of capturing and integrating an image in an image capture device comprising the steps of:
   turning the image capture device on in response to a user's activation of a first electromechanical actuator;
   exposing an optoelectric transducer disposed in a housing of the device to light input via a light transmissive opening through said housing;
   converting said light into an electrical signal;
   accepting a user instruction to said first electromechanical actuator to save said electrical signal as a stored image representation;

accepting a user instruction to a second electromechanical activator to review said stored image representation;

recalling said image representation; and accepting a user instruction to said second electromechanical activator to turn the image capturing device off.

6. A method in accordance with the method of claim 5 wherein said steps of accepting a user instruction to said second electromechanical activator to review said stored image representation and accepting a user instruction to said second electromechanical activator to turn the image capturing device off further comprises the steps of accepting a momentary user instruction to said second electromechanical activator to review said stored image representation and accepting a continuous user instruction to turn the image capturing device off.

7. A method in accordance with the method of claim 5 further comprising the step of accepting a user instruction to a third electromechanical activator to delete said stored image representation.

8. An image capturing device comprising
a housing;
an optoelectric transducer disposed in said housing, arranged to accept an optical input via a light transmissive opening through said housing, and to convert said optical input to an electrical signal;
an image processor disposed within said housing and electrically coupled to said optoelectric transducer;
a memory coupled to said image processor;
a user interface further comprising a first electromechanical activator adapted to accept both a user instruction to turn the image capturing device on and to save said electrical signal as a stored image representation and a second electromechanical activator adapted to accept both a user instruction to review said stored image representation and to turn the image capturing device off; and
an integral interface connector coupled to said image processor and adapted to be coupled to an external computer without an intervening cable.

9. An image capturing device in accordance with claim 8 wherein said second electromechanical activator is further adapted to accept a momentary user instruction to review said stored image representation and to accept a continuous user instruction to turn the image capturing device off.

* * * * *